United States Patent

Schultz et al.

[15] 3,676,408

[45] July 11, 1972

[54] METHYL VINYL ETHER COPOLYMERS

[72] Inventors: Herman S. Schultz, Easton; William Katzenstein, Broomal; Earl P. Williams, Pen Argl, all of Pa.

[73] Assignee: GAF Corporation, New York, N.Y.

[22] Filed: Oct. 23, 1969

[21] Appl. No.: 870,362

Related U.S. Application Data

[60] Division of Ser. No. 691,935, Dec. 20, 1967, Pat. No. 3,541,015, which is a continuation-in-part of Ser. No. 515,201, Dec. 20, 1965, abandoned.

[52] U.S. Cl.............................................260/80.3 E, 252/52
[51] Int. Cl........................................C08f 15/10, C08f 1/72
[58] Field of Search............260/80 P, 80.3 E, 80.76, 91.1 M

[56] References Cited

UNITED STATES PATENTS

| | | | |
|---|---|---|---|
| 2,020,703 | 11/1935 | Schumann | 260/91.1 |
| 2,108,994 | 2/1938 | Reppe | 8/6 |
| 3,159,613 | 12/1964 | Vandenberg | 260/91.1 |
| 3,386,980 | 6/1968 | Lal | 260/91.1 |

Primary Examiner—Joseph L. Schofer
Assistant Examiner—C. A. Henderson, Jr.
Attorney—Samson B. Leavitt, George L. Tone and Walter C. Kehm

[57] ABSTRACT

Methyl vinyl ether is copolymerized with a comonomeric compound of the formula: $CH_2-CHOR$ wherein R is phenyl or alkyl of from three to 30 carbon atoms, to give a copolymer containing from 20 to 85 weight percent of said comonomeric compound and having an inherent viscosity (0.1 percent solution in toluene) at 25° C. in the range of 0.6 to 2.0. The resulting copolymer is soluble in hydrocarbon lubricating oils and exhibits a unique combination of properties, such as viscosity index improver, thickener, good shear stability, good 0° F. properties, and as ashless dispersant for gums, resins and other oxidation products, present or formed, in the lubricating oil during the operation of combustion engines of various types.

6 Claims, No Drawings

METHYL VINYL ETHER COPOLYMERS

This application is a division of application Ser. No. 691,935, filed Dec. 20, 1967, now U.S. Pat. No. 3,541,015, which is in turn a continuation-in-part of application Ser. No. 515,201, filed Dec. 20, 1965 and now abandoned.

This invention relates to a new and useful class of methyl vinyl ether copolymers and to hydrocarbon lubricating oil compositions containing the same.

The majority of lubricating oil compositions for combustion engines are based on refined lubricating oils modified by specific additives that impart further desirable characteristics, such as high viscosity index, good thickening properties in the useful temperature range, shear stability, detergency and sludge inhibition. In developing lubricating oil additives to impart these characteristics, two or more materials must be added to the base lubricating oil without adversely affecting other desirable performance characteristics of the finished lubricant. It is well-known that multi-functional additives or additive systems that improve two or more properties of the base lubricating oil have been and are the object of extensive research.

Poly (methyl vinyl ether) is insoluble in lower aliphatic hydrocarbons and lube oils. Poly (ethyl vinyl ether) while soluble in heptane, is insoluble in lube oils. Poly (alkyl vinyl ethers), i.e., homopolymers, wherein the alkyl ranges from three to about 18 carbon atoms, while soluble in heptane and lube oils, do not exhibit, when employed as lube oil additives, high viscosity index, satisfactory thickening, dispersancy, good shear stability, etc.

It is the principal object of the present invention to provide a new and useful class of copolymers of methyl vinyl ether with one or more other higher alkyl or aryl vinyl ethers which surprisingly exhibit a unique combination of properties in hydrocarbon lubricating oil compositions.

A further object of the present invention is to provide an improved lubricating composition containing a single multifunctional additive which not only acts as viscosity index improver, thickener, but also displays good shear stability, good 0° F. properties, and functions as an ashless dispersant for gums, resins and other oxidation products which may be present or be formed in the lubricating oil during the operation of combustion engines of various types.

Other objects and advantages will become more clearly evident from the following description.

We have discovered that when methyl vinyl ether is copolymerized in certain weight percent proportions with certain weight percent proportions of an aryl- or alkyl-vinyl ether in which the alkyl contains from three to 30 carbon atoms, a new class of copolymers are obtained which are soluble and which exhibit a unique combination of properties in hydrocarbon lubricating oils. In view of this solubility and unique combination of properties, the copolymers are ideally suited as multi-functional additives to hydrocarbon lubricating oils. When used in lubricating oils in amounts in the concentration range of one to four weight percent, the multi-functional additive copolymers of the present invention impart high viscosity index, satisfactory thickening, excellent dispersancy, good shear stability, and good 0° F. properties. The multi-functional additive copolymers may be added advantageously in the same concentration range to fuel oils or jet fuels to disperse sludge.

The multi-functional additive copolymers can be made up as concentrates in a hydrocarbon lubricating oil stock in the order of 30–40 percent for use as a convenient way of incorporating or dissolving them in a base stock.

A hydrocarbon lubricating oil containing the multi-functional additive copolymers can contain other additives used to improve other properties such as, for example, antioxidants, extreme pressure agents or pour point dispersants, all of which are well-known to the art.

The multi-functional additive copolymers of the present invention can be employed to improve various hydrocarbon lubricating oils, i.e., base oils of natural origin, such as naphthenic base, paraffin base, mixed base lubricating oils and lubricating oils derived from coal products. The natural hydrocarbon base oils may be blends of different mineral oil distillates and bright stock or blends of such oils with synthetic hydrocarbon lube oils. The oils used generally will have a viscosity in the range of 10–50 SSU (Saybolt Universal Seconds) at 210° F., a viscosity index in the range of 60 to 110, a pour point below 0° F., and flash point above 400° F.

The copolymers having the foregoing unique combination of properties are prepared by copolymerizing the following comonomers in the stated weight percent:

Comonomers

| Alkyl vinyl ether | Wt. % | Methyl vinyl ether | Wt. % |
| --- | --- | --- | --- |
| From 3 to 4 alkyl carbon atoms | 45–80 | | 20–55 |
| From 8 to 10 alkyl carbon atoms | 25–80 | | 20–75 |
| From 16 to 18 alkyl carbon atoms | 15–80 | | 20–85 |
| From 20 to 30 alkyl carbon atoms | 15–80 | | 20–85 |
| Phenyl vinyl ether | 15–80 | | 20–85 |

The preferred range being in the following weight percent:

Comonomers

| Alkyl vinyl ether | wt. % | Methyl vinyl ether | wt. % |
| --- | --- | --- | --- |
| From 3 to 4 alkyl carbon atoms | 55–80 | 20–45 | |
| From 8 to 10 alkyl carbon atoms | 30–65 | 35–70 | |
| From 16 to 18 alkyl carbon atoms | 40–70 | 30–60 | |
| From 20 to 30 alkyl carbon atoms | 15–70 | 30–85 | |
| Phenyl vinyl ether | 40–70 | 30–60 | |

The comonomeric aryl- and alkyl-vinyl ethers employed with methyl vinyl ether in the aforestated weight percent proportions are characterized by the formula:

$$CH_2 = CHOR$$

wherein R is a straight- or branched-chain alkyl of from three to 30 carbon atoms, such as n-propyl, isopropyl, n-butyl, isobutyl, amyl, isoamyl, n-hexyl, 2-ethylbutyl, 1,3-dimethylbutyl, diisopropylmethyl, 2-ethylhexyl, n-octyl, 1-methylheptyl, isooctyl, nonyl, n-decyl, 1-methyl-4-ethyl-octyl, n-tetradecyl, cetyl, n-octadecyl eicosyl, ceryl and myricyl, or aryl such as phenyl. Vinyl alkyl ethers containing the latter three alkyl groups are prepared by vinylation of eicosyl alcohol and other high boiling alcohols such as ceryl from Chinese wax and myricyl from carnauba wax by acetylene in accordance with the procedure described in U. S. Pat. No. 2,045,393.

Mixed alkyl vinyl ethers may also be employed as comonomers with the methyl vinyl ether. Such mixed ethers are readily prepared by vinylation of alcohols produced by the oxo process from mono-olefinic hydrocarbons of about eight to 22 carbon atoms, or vinylation of mixed alcohols having from six to 22 carbon atoms obtained by the sulfation of $\alpha$-olefins of from six to 22 carbon atoms with sulfuric acid followed by hydrolysis in accordance with known procedures.

In copolymerizing the foregoing comonomers, a boron trifluoride (ethrate) in 1,4-dioxane is employed as a catalyst in heptane toluene as heptane toluene mixtures usually beginning at 0° C. Other boron trifluoride complexes, Friedel-Craft or cationic polymerization catalysts can also be used. Prior to copolymerization, it is desirable that each of the comonomers be purified with respect to organic impurities and water by either sodium treatment, or distillation over sodium followed by storage of sodium ribbon. The dioxane, heptane and toluene should be acid washed, dried, distilled and stored over sodium ribbon. The copolymerization reaction should begin at 0° C. (ice bath in Dewar flask). A temperature as low as −80° C. (dry ice-acetone bath) can be used.

The reactor employed in preparing the copolymers of the present invention was a citrate of magnesia bottle capped with perforated crown cap over a self-sealing butadiene-acetylonitrile copolymer rubber (solvent extracted) line. The top of each bottle reactor is equipped with any suitable device which will make it possible to inject the comonomers, the catalyst and solvent while employing a hypodermic syringe technique and while keeping a flow of nitrogen around it. A nitrogen filled dry box may be used, where appropriate, during the manipulation of the reactor. Every effort should be made to make the reactants, reaction system, and manipulation of the reactor as anhydrous as possible. The copolymerization reaction may also be carried out in standard four-neck, round-bottom, or Morton flasks appropriately equipped to meet the foregoing reaction requirements. The time to complete the copolymerization reaction may range from one-half to 20 hours together with variations, as will be noted in the illustrative working examples.

The copolymers thus obtained will have an inherent viscosity, $\eta$ inh, 0.1 percent solution in toluene at 25° C., of from about 0.5 to 2.0. Those having an inherent viscosity of 0.6 to 2.0, however, are preferred for the purpose of the present invention since they impart the desired combination of properties when added to hydrocarbon lube oils.

The copolymeric product may be incorporated or dissolved directly in a hydrocarbon lubricating oil with heating, introduced as a toluene solution, followed by stripping in a flash evaporator under vacuum with heat or introduced as a tetrahydrofuran solution followed by stripping in a flash evaporator under vacuum with heating. The latter is used in illustrating the present invention while employing mainly a 100 second solvent refined naphthenic oil in the evaluation of the lube oil additive copolymers.

In evaluating the copolymeric multi-functional additives of the present invention, the kinematic viscosities at 100° F. and 210° F. were determined according to ASTM Procedure D 445–61.

In the following Examples 1 to 18, the viscosity indices were calculated according to ASTM procedure D 567–53. In Example 19, ASTM procedure D 2270 was employed to calculate the viscosity index.

Shear stability of the copolymer containing oils by means of a sonic shear test was determined according to "Proposed Method of Test for Shear Stability of Polymer-Containing Oils," Appendix XII, page 1,160, Vol. I, 38 Edition, Oct., 1961, ASTM Committee D–2 on Petroleum Products and Lubricants. The shear time used is one-half hour.

units can be converted to centistoke by dividing by 4.6.

The copolymers prepared in accordance with the present invention are also useful in many water-insoluble organic liquid-liquid, liquid-solid, or gas-liquid systems which are not compatible (not mutually suspended or dispersed) in the absence of the copolymer.

The following examples show how the oil soluble copolymeric multi-functional additives are prepared and the unique properties obtained when incorporated in hydrocarbon lubricating oils.

EXAMPLES 1 to 6

The following reactions were carried out in carefully cleaned, dried and capped citrate of magnesia bottles equipped with perforated crown cap and butadiene-acrylonitrile copolymer rubber self-sealing lines. Methyl vinyl ether (purified and dried over sodium ribbon) was transferred through a closed initially evacuated system from the storage vessel into the cooled reactor bottle by way of a hypodermic needle. The other reagents were then charged into the reactors by the use of hypodermic syringe techniques. The comonomer vinyl ether in Example 1 and 2 is a distillation fraction of Isooctyl vinyl ether made from oxo isooctyl alcohol.

In Examples 3 and 4 it is 2-ethylhexyl vinyl ether and in Examples 5 and 6 it is a fraction from the distillation of the vinyl ether made from Conoco Alfol 810 alcohol containing about 44 percent alkyl $C_8$ and 55 percent alkyl $C_{10}$ vinyl ethers. Aliquots of a stock solution containing 0.0929 gm. $BF_3$-diethyl etherate per cc. 1,4 dioxane total solution was finally injected into the temperature equilibrated bottle in a 0° C. ice-water bath and hand mixed immediately. Table 1A summarizes the reagents used in the examples. The reaction took place immediately after catalyst injection. The reactors were allowed to stand in the ice-water bath for 22 hours. The reactions were quenched with a small amount of methanolic ammonia, diluted with reaction solvent, the solution filtered through a sintered glass funnel to remove the catalyst complex, and the solution pumped under vacuum several days first at ambient temperature and then at 40°–50° C. to remove solvent.

TABLE 1A

| Example number | Gms. MVE | Gms. comonomer | Cc. solvent | Reaction solvent | Cc. $BF_3$ etherate in 1,4-dioxane | Weight percent comonomer in monomer mixture | Yield, percent | $\eta$inh 0.1% toluene |
|---|---|---|---|---|---|---|---|---|
| 1 | 13.9 | 16 | 18.4 | Toluene | 0.259 | 53.5 | 90.5 | 0.925 |
| 2 | 14.3 | 16.8 | 19.1 | Heptane | 0.264 | 54.0 | 90.6 | 0.889 |
| 3 | 14.1 | 16.8 | 18.9 | Toluene | 0.262 | 54.4 | 100 | 0.506 |
| 4 | 15.1 | 17.8 | 20.2 | Heptane | 0.283 | 54.1 | 87.6 | 1.095 |
| 5 | 16.4 | 19.6 | 22.0 | Toluene | 0.309 | 54.5 | 100 | 0.506 |
| 6 | 19.6 | 23.2 | 26.2 | Heptane | 0.369 | 54.2 | 89.6 | 1.08 |

The sludge dispersancy test is that described in paper 23, pages 307–318 of Section 5 Proceedings of the Fifth World Petroleum Congress, 1959, New York, by R. M. Jolie. All of the copolymers that tested satisfactorily gave opaque suspensions or dispersions, hence all "passed" the dispersancy test as illustrated hereinafter in Table 1B.

Extrapolated oil viscosities, the official procedure generally used in the trade, were determined according to the method described on pages 275–276 of the 1961 SAE Handbook.

It is to be noted that Saybolt Universal seconds viscosity

Table 1B summarizes the results of testing 2 weight percent solution of the copolymers in 100 second solvent refined naphthenic oil:

TABLE 1B

| Example Number | Before shear | | | | After shear | | |
|---|---|---|---|---|---|---|---|
| | KV–210° F./ KV–100° F. centistokes | VI | KV–0° F. in centistokes extrapolated | Dispersancy | VI/VI decrease | KV–100° F. percent visc. decrease | |
| 1 | 8.32/46.67 | 143 | 1,400 | Pass | 136/7 | | |
| 2 | 7.39/41.06 | 144 | 1,200 | do | 135/9 | 17.0 | |
| 3 | 5.75/32.8 | 130 | | | | 9.0 | |
| 4 | 8.07/45.0 | 142 | 1,300 | Pass | 135/7 | 16.0 | |
| 5 | 5.75/32.74 | 127 | | | | | |
| 6 | 7.70/43.47 | 140 | 1,200 | Pass | 136/4 | 11.0 | |
| Acryloid 966"[1] | 7.44/37.22 | 150 | 850 | do | 127/23 | 28.5 | |
| Base oil | 4.02/22.03 | 80 | | | | | |

[1] (Rohm & Haas).

It is to be noted that the copolymers of Examples 3 and 5, which have an inherent viscosity of 0.5, are deficient in V. I. as compared with related copolymers of Examples 4 and 6. It is to be further noted that the shear stability of the commercially available lube oil additive "Acryloid 966" is significantly poorer than the copolymers of Examples 2, 3, 4 and 6 as shown by the KV-100°F.% viscosity decrease.

EXAMPLE 7

This polymerization was carried out in a 500 cc. Morton flask appropriately equipped to efficiently stir the reactor mixture, record the temperature of reaction continuously and efficiently keep volatile reaction components condensed in the reaction vessel. A great effort was made to make the reaction system and the polymerization manipulation as anhydrous as possible. The reactor was kept under slight nitrogen pressure and all reagents were injected using specially prepared hypodermic syringes.

Fifty-five grams of purified and dried methyl vinyl ether were vaporized from a storage vessel and condensed into the cooled reactor. 65.4 grams purified and dried isooctyl vinyl ether (same as used in Examples 1 and 2) were then injected, followed by 78 cc. purified and dried heptane. The reaction mixture was equilibrated with a 0° C. ice-water bath. 0.946 cc. solution of $BF_3$-etherate in 1,4 dioxane (0.102 g./cc. titer) was injected to the rapidly stirring solution. Temperature rose quickly to 18½° C. in a few minutes and slowly fell back to 6° C. in 18 minutes. The reaction was allowed to proceed overnight at mainly 0°–2° C. The next day the viscous reaction mixture was warmed to 40° C. and then quenched with methanolic ammonia. The yield after workup was 90.6% and $\eta$inh (0.1 percent, toluene) is 0.94. Table 2 summarizes testing in the same lube oil stock as Example No. 1 at 2 weight percent concentration.

TABLE 2

| Example Number | KV-210° F./ KV-100° F. centistokes | VI | KV-0° F. in centistokes extrapolated | Dispersancy |
|---|---|---|---|---|
| 7 | 7.98/44.23 | 144 | 1,500 | Pass. |
| 8 | 7.51/42.41 | 140 | 1,250 | Do. |

EXAMPLES 9, 10 and 11

The copolymerizations were carried out in the same fashion as in Examples 1 to 6. The comonomer was 2-ethyl hexyl vinyl ether. The reaction solvent was 20 volume percent toluene in heptane. The $BF_3$-diethyl etherate in 1,4-dioxane titer was 0.995 g./cc. The reaction bottles were equilibrated with a 0° C. ice-water bath before catalyst injection. Table 3A summarizes the reagents in the examples. The reactions were carried out overnight in a 0° C. bath followed by a usual workup. Table 3B summarizes testing data in the standard 100 second solvent refined stock.

TABLE 3A

| Example No. | Gms. MVE | Gms. 2-EHVE | Cc. solvent | Cc. $BF_3$-diethyl etherate in 1,4-dioxane | Weight percent comonomer in mixture | Yield, percent | $\eta$ inh 0.1% toluene |
|---|---|---|---|---|---|---|---|
| 9 | 10.7 | 7.6 | 14.7 | 0.167 | 41.5 | 95.0 | 0.57 |
| 10 | 10.7 | 9.9 | 16.5 | 0.178 | 48 | 94.8 | 0.60 |
| 11 | 8.0 | 9.2 | 13.8 | 0.141 | 53.5 | 95.3 | 0.69 |

EXAMPLE 12

This copolymerization was carried out in the same fashion as Example 1 except that cetyl vinyl ether was used as comonomer with methyl vinyl ether. 11.5 grams methyl vinyl ether, 14.5 grams cetyl vinyl ether and 20.8 cc. of a 50/50 volume percent mixture of toluene and heptane were charged into the reaction bottle. After equilibration with an ice-water bath, 0.181 cc. of a $BF_3$-diethyl etherate in 1,4-dioxane solution (0.0995 gm./cc. titer) was injected. Immediate reaction took place and after overnight reaction and workup resulted in a 97.1 percent yield and $\eta$inh (0.1 percent, toluene) of 0.70. The weight percent cetyl vinyl ether in the starting mixture is 55.8 percent. Table 4 summarizes the lube oil test data in the standard 100 second solvent refined stock.

TABLE 3B

| Example Number | Conc., weight percent | Before shear KV-210° F./ KV-100° F. | VI | KV-0 °F. in centistokes extrapolated | Dispersancy | After shear KV—100° F. percent visc. decrease |
|---|---|---|---|---|---|---|
| 9 | 1 | 5.44/28.33 | 139 | 800 | | |
| 9 | 2 | 5.57/30.05 | 138 | 1,100 | Passed | 5.7 |
| 9 | 3 | 7.15/38.45 | 144 | 900 | | |
| 10 | 1 | 48.4/27.02 | 112 | 1,000 | | |
| 10 | 2 | 6.18/34.68 | 134 | 1,200 | Passed | 8.5 |
| 10 | 3 | 7.66/43.88 | 139 | 2,200 | | |
| 11 | 1 | 5.10/28.57 | 119 | 1,100 | | |
| 11 | 2 | 6.66/38.21 | 134 | 1,200 | Passed | 9.81 |
| 11 | 3 | 8.48/48.11 | 142 | 2,100 | | |

TABLE 4

| Example | Conc. percent | KV-210° F. KV-100° F. centistokes | VI Dispersancy | KV-0° F. in centistokes extrap. | KV-100° F. percent visc. decrease after shear |
|---|---|---|---|---|---|
| 12 | 1 | 5.53/30.32 | 121 | 1,050 | 7.4 |
| 12 | 2 | 7.01/39.89 | 137/pass | 1,200 | 11.0 |
| 12 | 3 | 9.11/52.31 | 142 | 2,000 | 9.9 |

EXAMPLE 8

A stirred run was carried out as in Example 7. 65 grams methyl vinyl ether were charged as before. 75.4 grams of an isooctyl vinyl ether fraction were charged followed by 98 cc. heptane. 1.15 cc. $BF_3$-diethyl etherate in 1,4-dioxane (titer is 0.0995 g. $BF_3$-diethyl etherate/cc. solution) were charged into the rapidly stirring 0° C. solution. Temperature rose immediately to 22° C. Temperature was quickly brought back to below 5° C. A second charge of catalyst of the same size as before was added after 3 hours and 50 minutes. The reaction ran overnight and was worked up the same way as before. The yield was 92 percent and $\eta$inh (0.1 percent toluene)—0.83. The lube oil test data is in Table 2.

EXAMPLE 13

This polymerization was carried out in the same fashion as Example 1 except that isobutyl vinyl ether was used as comonomer with methyl vinyl ether. 16.8 grams methyl vinyl ether, 26.4 grams isobutyl vinyl ether and 43.2 cc. heptane were charged into the reaction bottle. After equilibration with an ice-water bath, 0.315 cc. $BF_3$-diethyl etherate in 1,4-dioxane (titer = 0.0985 gm./cc.) was injected. Immediate reaction took place and after overnight reaction and workup resulted in a 95.8 percent yield and an $\eta$inh (0.1 percent, toluene) of 0.81. The weight percent isobutyl vinyl ether in the starting mixture is 61 percent. Table 5 summarizes the test data in the standard 100 second solvent refined stock.

TABLE 5

| Example Number | Conc. percent | KV-210°F./KV-100° F. centistokes | VI | KV-0° F. centistokes extrap. | Dispersancy | KV-100° F. percent visc. decrease after shear, percent |
|---|---|---|---|---|---|---|
| 13 | 1 | 5.32/29.7 | 124 | 1,000 | | 4.4 |
| 13 | 2 | 7.10/40.1 | 138 | 1,200 | Pass | |
| 13 | 3 | 9.70/54.4 | 144 | 1,800 | | |

EXAMPLE 14

This polymerization was carried out in a fashion similar to Example 7. 55 grams methyl vinyl ether were charged into the Morton flask as before. 16.8 cc. toluene and 67.2 cc. heptane were then charged into the reactor followed by 49.8 grams 2-ethylhexyl vinyl ether. 0.915 cc. $BF_3$-diethyl etherate in 1,4-dioxane (0.0988 g. $BF_3$-etherate in 1 cc. solution) was charged into the rapidly stirring 0° C. solution. The reaction took place immediately. The reaction was allowed to run overnight. After the usual workup the yield was found to be 91.5 percent and $\eta$inh (0.1 percent in toluene) is 1.24. Table 6 summarizes the lube oil test data. Lube oil A is a 100 second solvent refined naphthenic stock, Lube oil B is a 10w –30 high wax content oil, and Lube oil C is paraffinic base oil. The concentration is 2 percent.

From Table 7B it is clearly evident that the shear stability of the alkyl vinyl ether homopolymers, wherein the alkyl is from 3 to 16 carbon atoms, is significantly poorer when compared with the good stability of the copolymers of the present invention as shown in Tables 1B, 3B, 4, 5 and 6. Although the homopolymers show good low temperature properties, they do not show dispersancy.

EXAMPLE 19

This polymerization was carried out in a fashion similar to Example 7 except that a five neck appropriately equipped resin pot was used and the catalyst was added in two increments. 1300 cc. purified anhydrous toluene was added to the reactor by use of a special transfer vessel. The reactor was cooled to 0° C. and 508 grams purified dried 2-ethyl hexyl

TABLE 6

| Lube oil stocks | Conc. of polymer percent | KV-210° F./KV-100° F. centistokes | VI | dispersancy | KV-0° F. centistokes extrap. | KV-100° F. percent visc. decrease after sonic shear, percent | Percent VI decrease after shear, percent |
|---|---|---|---|---|---|---|---|
| A | 2 | 9.39/52.15 | 145/pass | | 1,300 | 11.0 | 0.7 |
| A | 0 | 4.23/24.05 | 80 | | | | |
| B | 2 | 10.33/58.18 | 154/pass | | 1,750 | 11 | |
| B | 0 | 5.08/30.1 | 107 | | | | |
| C | 2 | 11.72/77.48 | 135/pass | | 3,000 | 10.6 | |
| C | 0 | 5.78/42.67 | 80 | | | | |

EXAMPLES 15 to 18 (Comparative)

The homopolymerization of isobutyl, isooctyl and cetyl vinyl ethers was carried out as in Example 1. The purpose is to show the difference between homopolymers and the copolymers of the present invention. Table 7A shows the homopolymers prepared and their inherent viscosity in toluene.

TABLE 7A

| Example No. | Alkyl Vinyl Ether Polymer | Yield | $\eta$inh 0.1% in Toluene |
|---|---|---|---|
| 15 | Isooctyl | 95.5% | 0.97 |
| 16 | Isobutyl | 98.1% | 0.77 |
| 17 | Isobutyl | 100.0% | 1.08 |
| 18 | Cetyl | 100.0% | 0.62 |

Table 7B summarizes the lube oil test data of Examples 15 to 18 in the standard 100 second solvent refined stock.

vinyl ether was added in a similar fashion. The 603 grams purified dried methyl vinyl ether was added as a liquid by the use of a special transfer cylinder to the reactor at 0° C. 1.30 cc. $BF_3$-diethyl etherate in 1,4-dioxane (titer is 0.2 g./cc.$BF_3$-diethyl etherate in 1,4-dioxane) was charged into the rapidly stirring 0° C. solution. The temperature rose to 24° C. in 25 minutes and fell slowly to 10° C. in another hour. After a total of three hours, 2 cc. more catalyst solution was injected and temperature rose to 13° C. in 15 minutes. After a total of 22 hours with the final temperature at 4° C. the reaction was quenched with methanolic ammonia and worked up as before. The yield was 100 percent and $\eta$inh (0.1 percent, toluene) is 1.0.

The resulting polymer was evaluated with 2 commercially available lube oil additives in engine tests as shown in Table 8. The viscosity index values in this table were determined by ASTM procedure D 2270. A viscosity index value while employing ASTM procedure D 567-53 is also given in the accompanying table for comparison.

From Table 8 it is clearly evident that the polymer of Example 19 is not only more shear stable, but actually improves in V. I. performance while the 2 commercial products lose performance on shearing.

TABLE 7B

| Example Number | Conc. of polymer, percent | KV-210° F./KV-100° F. centistokes | VI | Dispersancy | KV-0° F. in centistokes extrapolation | KV-100° F. percent viscosity decrease after sonic shear, percent |
|---|---|---|---|---|---|---|
| 15 | 2 | 9.30/56 | 138 | Failed | 1,700 | 29 |
| 16 | 2 | 7.73/44.4 | 139 | do | 1,460 | 29 |
| 17 | 2 | 9.32/55.02 | 140 | do | 1,800 | 35 |
| 18 | 2 | 7.63/44.35 | 137 | do | 1,400 | 24 |

TABLE 8

|  | Polymer of Ex. 19 | Rohm & Haas "Acryloid 763" | "Acryloid 622" |
|---|---|---|---|
| Viscosity at 210°F., centistokes (1) | 10.48 | 10.77 | 10.50 |
| Viscosity at 100°F. | 61.1 | 60.4 | 55.7 |
| Concentration, Vol. %) (33.1 wt.% in oil for Ex. 19) | 5.75 | 5.90 | 6.30 |
| Viscosity index, new soln. before testing (142 by ASTM D 567–53 for Ex. 19) | 173 | 177 | 204 |
| Viscosity index, after testing in dynamometer engine | 178 | 165 | 184 |
| Viscosity at 0°F., centistokes | 2090 | 1810 | 1784 |
| Shear Losses: KV–210°F. % Viscosity Decrease: |  |  |  |
| Car, high mileage (2) | 12.9 | 17.1 | 20.1 |
| Car, low mileage (3) | 12.8 | 16.0 | 19.5 |
| Dynamometer engine (3) | 14.1 | 20.8 | 21.7 |
| Shear Losses: KV–0°F. %Viscosity Decrease: |  |  |  |
| Car, high mileage (2) | 6.2 | 17 | 15 |
| Dynamometer engine (4) | 7.1 | 7.9 | 24.6 |

(1) Base oil viscosity at 210°F. = 5.54 centistokes
100°F. =35.7 centistokes
(2) 1963 Ford Galaxie 289 CID V–8, 60,000 engine miles, 500 mi./test.
(3) 1966 Buick Le Sabre 340 CID V–8, 10,000 engine "500 mi./test.
(4) 1960 Olds Seq. I Engine, 2500 rpm. no load, 5 hrs./test.

The commercially available lube oil additives employed for comparison in Table 1B and Table 8 are products having the following characteristics:

"Acryloid 622"—a clear, viscous concentrate of methacrylate copolymer in solvent-refined 100 SUS/100°F. neutral oil.

| Viscosity: | SUS/100°F. | 136,000 |
|---|---|---|
|  | SUS/210°F. | 5,350 |

"Acryloid 763"—a clear, viscous concentrate of methacrylic polymer in Mid-Continent solvent—refined 150 SUS/100° F. neutral oil.

| Viscosity: | SUS/100°F. | 7,200 |
|---|---|---|
|  | SUS/210°F. | 800 |

"Acryloid 966"—a hazy, viscous polymer concentrate in solvent-refined 100 SUS/100°F. neutral oil.

| Viscosity: | SUS/100°F. | 74,000 |
|---|---|---|
|  | SUS/210°F. | 3,840 |

We claim:

1. Oil soluble copolymer of methyl vinyl ether and a compound having the formula $CH_2 = CHOR$ wherein R is selected from the group consisting of phenyl and an alkyl of from three to 30 carbon atoms, said copolymer containing from 20 to 85 weight percent of a compound having the said formula, said copolymer having an inherent viscosity (0.1 percent solution in toluene) at 25° C. in the range of 0.6 to 2.0.

2. Oil soluble copolymer according to claim 1 wherein said copolymer consists of 45 weight percent of methyl vinyl ether and 55 weight percent of isooctyl vinyl ether and having an inherent viscosity (0.1 percent solution in toluene) at 25° C. of 0.9.

3. Oil soluble copolymer according to claim 1 wherein said copolymer consists of 50 weight percent of methyl vinyl ether and 50 weight percent of 2-ethyl-hexyl vinyl ether and having an inherent viscosity (0.1 percent solution in toluene) at 25° C. of 1.24.

4. Oil soluble copolymer according to claim 1 wherein said copolymer consists of 40 weight percent of methyl vinyl ether and 60 weight percent of cetyl vinyl ether and having an inherent viscosity (0.1 percent solution in toluene) at 25° C. of 0.7.

5. Oil soluble copolymer according to claim 1 wherein said copolymer consists of 40 weight percent of methyl vinyl ether and 60 weight percent of isobutyl vinyl ether and having an inherent viscosity (0.1 percent solution in toluene) at 25° C. of 0.8.

6. Oil soluble copolymer according to claim 1 wherein said copolymer consists of 45 weight percent of methyl vinyl ether and 55 weight percent of decyl vinyl ether and having an inherent viscosity (0.1 percent solution in toluene) at 25° C. of 1.2.

* * * * *